M. D. KRESPACH & J. R. HAZELEY.
VEHICLE WHEEL.
APPLICATION FILED OCT. 17, 1912.
1,076,678. Patented Oct. 28, 1913.
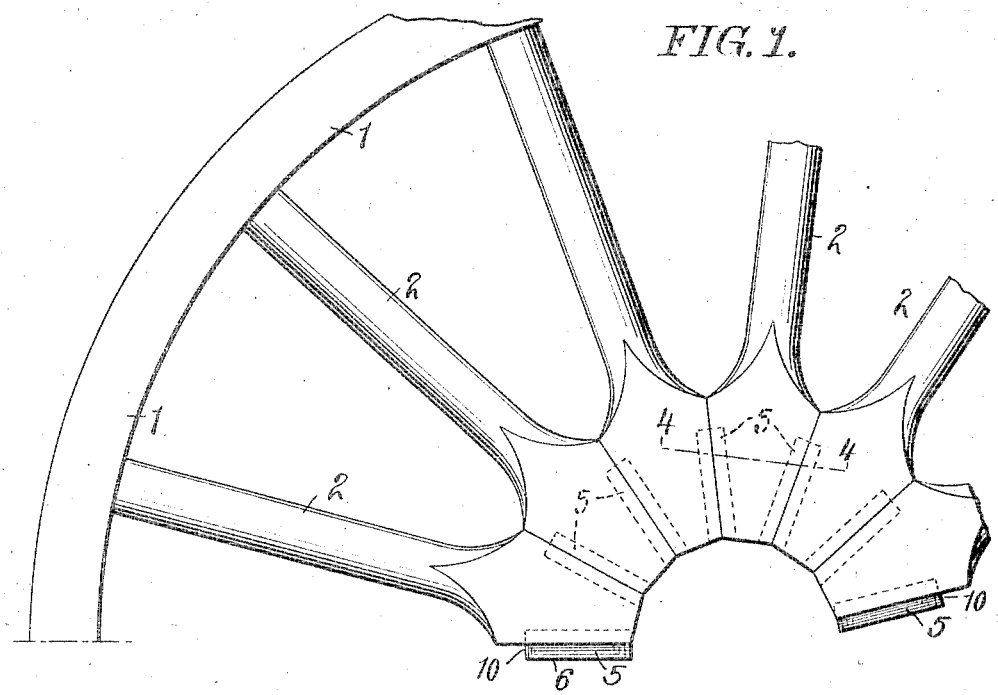
FIG. 1.
FIG. 2.
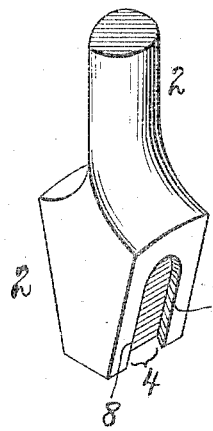
FIG. 3.
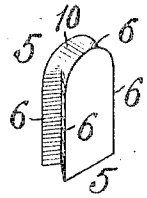
FIG. 4.
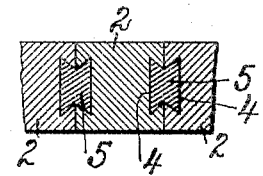
Witnesses:
Inventors:
Martin D. Krespach and
James R. Hazeley,
By their Attorney
F. DeWitt Goodwin

UNITED STATES PATENT OFFICE.

MARTIN D. KRESPACH AND JAMES R. HAZELEY, OF PHILADELPHIA, PENNSYLVANIA, ASSIGNORS TO ECLIPSE WHEEL COMPANY, A CORPORATION OF NEW JERSEY.

VEHICLE-WHEEL.

1,076,678.

Specification of Letters Patent.

Patented Oct. 28, 1913.

Application filed October 17, 1912. Serial No. 726,191.

*To all whom it may concern:*

Be it known that we, MARTIN D. KRESPACH and JAMES R. HAZELEY, citizens of the United States, residing at Philadelphia, in the county of Philadelphia and State of Pennsylvania, have invented certain new and useful Improvements in Vehicle-Wheels, of which the following is a specification.

Our invention relates to improvements in vehicle wheels and particularly to a wheel having the spokes contiguous at their inner ends and to which are bolted upon each side thereof metal flanges having sleeves forming the hub of the wheel.

The object of our invention is to construct a wheel having the contiguous spokes secured together by a key which will rigidly hold the spokes together at the hub of the wheel; and a further object of our invention is to provide a key which may be inserted between the spokes from the central opening of the wheel, thus providing a wheel which may be readily repaired, by inserting a new spoke, without removing the other spokes or the felly.

Referring to the accompanying drawing in which like references refer to like parts: Figure 1 is a side elevation of a portion of our improved wheel; Fig. 2, is a perspective view of the inner end of one of the spokes, showing the dovetail key-way; Fig. 3, is a perspective view of one of the keys detached and Fig. 4, is a horizontal section on line 4—4, Fig. 1.

In the drawing 1, represents the felly and 2 the spokes. The inner ends of the spokes are made wedge shape, so that the adjacent surfaces of the spokes will fit together, as shown in Fig. 1. Each spoke is provided with dovetail key-ways 4, formed in the opposite faces thereof. Said key-ways 4 extend longitudinally and are formed in the faces of the spoke which contact with the adjacent spokes. The key 5 is provided, upon its sides, with grooves, forming beveled edges 6, which correspond with the dovetail surfaces 8, forming the sides of the keyway 4. The keys 5 are double the thickness of the depth of the key-ways 4, formed in the spoke, so that one half of the key will be contained in each of the adjacent spokes.

The key-way 4, formed in the spoke 2 extends from the inner end of the spoke to within a short distance of the outer edge of the enlarged shoulder of the spoke; thus leaving a solid portion of the spoke at the outer end of the key-way which forms a stop and limits the outward movement of the key 5. The said solid portions of the shoulders of the spokes bear against each other, when the wheel is assembled, and a solid arch is thus formed which gives great strength to the wheel and the latter is not weakened by the key-ways formed in the spokes as said key-ways do not extend entirely through the shoulders of the spokes.

The end 10, of the key 5, has the corners rounded off, so as to avoid the necessity of making square corners in the key-way 4, formed in the faces of the spoke. It being a more difficult operation to cut the corners of the key-way square than round and the rounded corners of the key-way saves the material of the spoke and gives it more strength.

The wheel may be assembled by placing the key 5 in one spoke and slipping the next spoke over the portion of the key projecting out of the first mentioned spoke or the spokes may be placed side by side, and the keys driven into the key-ways, from the central opening of the wheel. Thus rigidly holding the spokes together to resist a lateral strain upon the wheel.

A wheel may be readily repaired when it is constructed in this manner. A broken spoke may be removed without removing the felly, by first removing the metal hub flanges, which are not shown in the drawing, then by sawing or cutting away the broken spoke so that it can be removed from the wheel, and the keys removed at the sides of the space formed by the removal of the spoke. A new spoke is now inserted by placing the outer end of the spoke in the recess in the felly, and by sliding the inner end of the spoke sidewise into the space between the other spokes, new keys are now inserted into the key-ways formed at each side of the new spoke by driving the keys from the central opening of the wheel. Thus a new spoke can be readily inserted without disturbing the other spokes or the felly.

Having thus described our invention, we claim and desire to secure by Letters Patent:

1. In a wheel, the combination of spokes having longitudinal dovetail key-ways formed in their contiguous surfaces, a removable key fitting into said key-ways, and said key having beveled edges formed thereon corresponding to the key-ways formed in two of the contiguous spokes.

2. In a wheel, the combination of spokes having dovetail key-ways formed in their contiguous surfaces, a removable key seated in said key-ways formed in two of the contiguous spokes, and a stop formed by the solid portion of the spokes at the outer end of the key-ways to limit the outward movement of the key.

3. In a wheel, the combination of spokes having dovetail key-ways formed in their contiguous surfaces, a key seated in said key-ways formed in two of the contiguous spokes, one end of the said key being rounded, a stop formed by the solid portion of the spokes at the outer end of the key-ways and said stop being rounded to correspond to the round end of the key.

In testimony whereof we have affixed our signatures in presence of two witnesses.

MARTIN D. KRESPACH.
JAMES R. HAZELEY.

Witnesses:
 IDA M. BASFORD,
 L. M. CANNOM.